United States Patent
Park et al.

(10) Patent No.: US 10,340,503 B2
(45) Date of Patent: Jul. 2, 2019

(54) POUCH-SHAPED SECONDARY BATTERY INCLUDING ELECTRODE LEAD HAVING NOTCH FORMED THEREIN

(71) Applicant: LG Chem, Ltd., Seoul (KR)

(72) Inventors: Jong Pil Park, Daejeon (KR); Kyoung Ho Kim, Daejeon (KR); Min Woo Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/029,177

(22) Filed: Jul. 6, 2018

(65) Prior Publication Data
US 2019/0013509 A1     Jan. 10, 2019

(30) Foreign Application Priority Data
Jul. 6, 2017   (KR) .................. 10-2017-0085717

(51) Int. Cl.
| | |
|---|---|
| *H01M 2/34* | (2006.01) |
| *H01M 2/02* | (2006.01) |
| *H01M 2/30* | (2006.01) |
| *H01M 2/26* | (2006.01) |
| *H01M 2/06* | (2006.01) |

(52) U.S. Cl.
CPC ......... *H01M 2/345* (2013.01); *H01M 2/0287* (2013.01); *H01M 2/06* (2013.01); *H01M 2/26* (2013.01); *H01M 2/30* (2013.01); *H01M 2200/20* (2013.01)

(58) Field of Classification Search
None
See application file for complete search history.

(56) References Cited

U.S. PATENT DOCUMENTS

| | | | |
|---|---|---|---|
| 9,893,344 B2 | 2/2018 | Choi et al. | |
| 2009/0162749 A1* | 6/2009 | Lee | H01M 2/021 |
| | | | 429/176 |
| 2009/0305126 A1* | 12/2009 | Choi | H01M 2/30 |
| | | | 429/159 |
| 2011/0104520 A1 | 5/2011 | Ahn | |
| 2012/0026635 A1 | 2/2012 | Koyama | |

(Continued)

FOREIGN PATENT DOCUMENTS

| | | |
|---|---|---|
| JP | 2011-249128 A | 12/2011 |
| KR | 100274938 B1 | 12/2000 |

(Continued)

*Primary Examiner* — Wyatt P McConnell
(74) *Attorney, Agent, or Firm* — Mintz Levin Cohn Ferris Glovsky and Popeo, P.C.; Kongsik Kim; Jhongwoo Jay Peck

(57) ABSTRACT

Disclosed herein is a pouch-shaped secondary battery including an electrode assembly in which a positive electrode and a negative electrode are stacked with a separator interposed, an electrode lead electrically connected to electrode tabs of the electrode assembly, a pouch-shaped battery case made of a laminate sheet including an outer coating layer, a metal layer, and an inner sealant layer, and a lead box disposed on a sealed portion of the battery case for receiving the electrode lead. In particular, the electrode lead includes a lower electrode lead, which is electrically connected to the electrode tabs, and an upper electrode lead, a portion of which is coupled to the lower electrode lead.

20 Claims, 7 Drawing Sheets

(56) References Cited

U.S. PATENT DOCUMENTS

| | | | |
|---|---|---|---|
| 2015/0072185 A1* | 3/2015 | Cho | H01M 2/30 429/56 |
| 2016/0028068 A1* | 1/2016 | Yang | H01M 2/1235 429/61 |
| 2016/0126526 A1 | 5/2016 | Yang et al. | |
| 2016/0141593 A1 | 5/2016 | Min et al. | |
| 2016/0197335 A1* | 7/2016 | Kim | H01M 2/30 429/179 |
| 2017/0125786 A1 | 5/2017 | Park et al. | |
| 2018/0053976 A1 | 2/2018 | Park et al. | |
| 2018/0062131 A1 | 3/2018 | Cho et al. | |
| 2018/0062151 A1 | 3/2018 | Kim | |

FOREIGN PATENT DOCUMENTS

| | | | | |
|---|---|---|---|---|
| KR | 1020000014824 | * | 12/2000 | H01M 2/10 |
| KR | 10-1192077 B1 | | 10/2012 | |
| KR | 20110048470 | * | 10/2012 | H01M 2/30 |
| KR | 10-2012-0139590 A | | 12/2012 | |
| KR | 10-1447064 B1 | | 10/2014 | |
| KR | 10-2015-0074439 A | | 7/2015 | |
| KR | 10-1601123 B1 | | 3/2016 | |
| KR | 10-1601135 B1 | | 3/2016 | |
| KR | 10-1614434 B1 | | 5/2016 | |
| KR | 2016-0057860 A | | 5/2016 | |
| KR | 10-2016-0125920 A | | 11/2016 | |
| KR | 10-2016-0129763 A | | 11/2016 | |
| KR | 2016-0144325 A | | 12/2016 | |
| KR | 2017-0021102 A | | 2/2017 | |
| KR | 101734703 B1 | * | 5/2017 | H01M 2/348 |
| KR | 2017-0060937 A | | 6/2017 | |
| WO | 2009-078372 A1 | | 6/2009 | |

* cited by examiner

FIG. 1

(Related Art)

POUCH-SHAPED SECONDARY BATTERY INCLUDING ELECTRODE LEAD HAVING NOTCH FORMED THEREIN

CROSS-REFERENCE TO RELATED APPLICATIONS

This application claims the benefit of Korean Patent Application No. 2017-0085717 filed on Jul. 6, 2017, the disclosure of which is herein incorporated by reference in its entirety.

TECHNICAL FIELD

The present disclosure relates to a pouch-shaped secondary battery including an electrode lead that includes a notch formed therein, and more particularly to a pouch-shaped secondary battery including an electrode lead having a notch formed therein, wherein the electrode lead is configured to be cut to secure the safety of a battery cell when the battery cell swells due to gas generated in the battery cell while the battery cell is in an abnormal state or when the pressure in the battery cell increases as a result of the battery cell being overcharged.

RELATED ART

In general, there are various kinds of secondary batteries, such as a nickel cadmium battery, a nickel hydride battery, a lithium ion battery, and a lithium ion polymer battery. Such secondary batteries have been used in large-sized products that require high output, such as an electric vehicle and a hybrid electric vehicle, a power storage device for storing surplus power or new and renewable energy, and a backup power storage device, as well as small-sized products, such as a digital camera, a portable digital versatile disc (DVD) player, an MP3 player, a cellular phone, a personal digital assistant (PDA), a portable game device, a power tool, and an electric bicycle (E-bike).

A lithium secondary battery generally includes a positive electrode (a cathode), a separator, and a negative electrode (an anode). The materials of the positive electrode, the separator, and the negative electrode are selected in consideration of the lifespan, the charge and discharge capacity, the temperature characteristics, the safety, and the like of the battery. In general, the lithium secondary battery is configured to have a three-layered structure, in which a positive electrode, a separator, and a negative electrode are sequentially stacked. Alternatively, the lithium secondary battery is configured to have a five-layered structure, in which a positive electrode, a separator, a negative electrode, a separator, and a positive electrode are sequentially stacked, or to have another five-layered structure, in which a negative electrode, a separator, a positive electrode, a separator, and a negative electrode are sequentially stacked. A plurality of unit cells is combined to constitute an electrode assembly or a secondary battery.

A lithium secondary battery is charged and discharged through a process in which lithium ions from a lithium metal oxide of a positive electrode are repeatedly intercalated into a negative electrode, such as a graphite electrode, and the lithium ions are repeatedly deintercalated from the negative electrode.

Heat may be generated from such a secondary battery in the event of occurrence of a short circuit in the secondary battery due to an external impact, overcharge of the secondary battery, or overdischarge of the secondary battery. As a result, an electrolyte may be decomposed in the secondary battery, and thermal runaway may occur in the secondary battery. That is, the safety of the secondary battery is compromised in several aspects. In particular, the secondary battery may explode for various reasons. In one example, the secondary battery may explode due to an increase in the pressure of the air in the secondary battery, which is caused by the decomposition of an electrolyte. Specifically, when the secondary battery is repeatedly charged and discharged, gas may be generated in the secondary battery as a result of the electrochemical reaction between the electrolyte and an electrode active material. The gas generated in the secondary battery increases the pressure in the secondary battery. Consequently, the fastening force between parts constituting the secondary battery may be reduced, an external case of the secondary battery may be damaged, a protection circuit of the secondary battery may be operated prematurely, an electrode of the secondary battery may be deformed, a short circuit may occur in the secondary battery, or the secondary battery may explode.

In order to secure the safety of such a battery when the battery is overcharged, overcurrent is prevented from flowing in the battery through the control of electronic parts, whereby the battery is prevented from being overcharged. To this end, a protection circuit, such as a protection circuit module (PCM), may be applied to the battery. Even where such an overcharge protection circuit, such as a PCM, is applied to the battery, it is difficult to sufficiently secure the safety of the battery. In particular, it is necessary for a pouch-shaped battery to be provided with a further improved protection circuit structure in order to more accurately check the swelling of the pouch-shaped battery.

In addition, there has been used a mechanical current interrupt device that physically interrupts the series connection of a battery pack using the pressure generated in the battery due to thermal expansion of the battery when the battery is overcharged in consideration of malfunction of the electronic parts of the battery. Generally, in the current interrupt device of the battery pack, there is widely used a method of physically cutting the series connection of the battery pack through the structure of the battery pack using only the pressure generated in the battery as the battery is expanded when the battery is overcharged in order to interrupt the flow of electric current in the battery pack. However, an electrode lead having a notch formed therein to interrupt the flow of electric current in a battery when the volume of the battery increases has not been suggested.

Korean Registered Patent No. 1601135 discloses a pouch-shaped secondary battery configured to have a structure in which two lead plates are coupled to each other via a polymer material interposed between the lead plates, in which a vent notch is provided in order to rapidly discharge gas, generated in the secondary battery, out of the secondary battery when the pressure in the secondary battery reaches a predetermined level due to the gas, and in which first and second sealants, which are interposed between the lead plates, exhibit electrical insulation and thermal fusion properties. However, a structure in which an electrode lead having a notch formed therein is disposed in a lead box has not been suggested.

Korean Patent Application Publication No. 2016-0125920 discloses a pouch-shaped secondary battery including an electrode assembly and a pouch sheathing member for receiving the electrode assembly, the pouch sheathing member including a first pouch unit and a second pouch unit, the first pouch unit and the second pouch unit being adhered to each other via a sealing unit, wherein the pouch-shaped secondary battery further includes a first electrode lead extending from the electrode assembly, the first electrode lead attached to the first pouch unit, a second electrode lead attached to the second pouch unit, the second electrode lead formed to protrude outwards from the pouch sheathing member, a first sealing member interposed between the first electrode lead and the second electrode lead for preventing the first electrode lead and the second electrode lead from contacting each other, and a film-shaped connection member for electrically connecting the first electrode lead and the second electrode lead to each other. However, a structure in which an electrode lead having a notch formed therein is disposed in a lead box has not been suggested.

Korean Registered Patent No. 1192077 discloses a secondary battery including an electrode assembly, which includes a first electrode, a second electrode, and a separator provided between the first electrode and the second electrode, a battery case for receiving the electrode assembly, an electrode terminal electrically connected to the first electrode, and a lead tab extending from the inside of the battery case out of the battery case, the lead tab electrically connected to the first electrode via the electrode terminal, wherein the lead tab is formed to be separated from at least a portion of the electrode terminal such that, when the battery case is deformed in the state in which the lead tab is in contact with the battery case, the lead tab can be electrically disconnected from the first electrode, the secondary battery further includes an adhesive member for adhering the lead tab to the electrode terminal, and the adhesive member is provided with a through-hole, through which the lead tab is electrically connected to the electrode terminal. However, a structure in which an electrode lead having a notch formed therein is disposed in a lead box has not been suggested.

Korean Registered Patent No. 1447064 discloses a battery cell configured such that an electrode assembly having a positive-electrode/separator/negative-electrode structure is mounted in a receiving unit of a battery case, wherein tabs (electrode tabs) having no active material coated thereon protrude from electrode plates that constitute the electrode assembly, an electrode lead for electrically connecting the electrode tabs to each other is disposed at one end of a stack of the electrode tabs, and the electrode lead is inserted into the electrode tabs at the electrical connection between the electrode tabs and the electrode lead due to the deformation of the electrode lead, whereby physical coupling between the electrode tabs and the electrode lead is achieved. However, a structure in which an electrode lead having a notch formed therein is disposed in a lead box has not been suggested.

In view of the foregoing, a secondary battery including an electrode lead having a notch formed therein in order to short-circuit the secondary battery when the pressure in the battery increases due to an abnormal state of the battery, for example, in the case in which the battery is overcharged or in the case in which gas is generated in the battery, has not been suggested.

SUMMARY

An object of the present disclosure is to provide a secondary battery including a lead box configured to receive an electrode lead having a notch formed therein, the lead box being disposed on a sealed portion of a battery case, in order to secure the safety of a battery cell when the pressure in the battery increases due to gas generated in the battery cell while the battery cell is in an abnormal state or when the battery cell is overcharged.

It is another object of the present disclosure to provide a short-circuit formation unit that is capable of maintaining the energy density of a battery cell without using an additional complicated device for interrupting the flow of electric current in the battery cell when the battery cell is in an abnormal state, for example, when the volume of the battery cell increases, and a secondary battery including the same.

In accordance with the present disclosure, the above and other objects can be accomplished by the provision of a pouch-shaped secondary battery including an electrode assembly configured to have a structure in which a positive electrode and a negative electrode are stacked in the state in which a separator is interposed between the positive electrode and the negative electrode, an electrode lead electrically connected to electrode tabs of the electrode assembly, a pouch-shaped battery case made of a laminate sheet including an outer coating layer, a metal layer, and an inner sealant layer, and a lead box located on a sealed portion of the battery case for receiving the electrode lead, wherein the electrode lead includes a lower electrode lead, electrically connected to the electrode tabs, and an upper electrode lead, a portion of which is coupled to the lower electrode lead, the thickness of the upper electrode lead being relatively large.

A closed-loop-type notch may be formed in one surface of the upper electrode lead. The surface of the upper electrode lead within the boundary of the closed-loop-type notch may be coupled to the lower electrode lead. The depth of the closed-loop-type notch may not be uniform.

Alternatively, a pair of notches may be formed in one surface of the upper electrode lead, and each of the pair of notches may be formed in a direction that is perpendicular to the longitudinal direction of the electrode lead. The central part of the upper electrode lead, disposed between the notches, may be coupled to the lower electrode lead. In particular, the notches may be configured such that the depth of a proximal notch that is disposed inside is greater than the depth of a distal notch that is disposed outside. The thickness of the upper electrode lead at the part thereof at which the proximal notch is formed may be 10% to 90% of the thickness of the upper electrode lead at the part thereof at which no notches are formed.

The upper electrode lead and/or the lower electrode lead may extend from the inner surface of a proximal side of the lead box to the inner surface of a distal side of the lead box such that the lower part of the lead box is hermetically sealed by the electrode lead. The pressure in the lower part of the lead box that is hermetically sealed may be less than atmospheric pressure or 1.5 atm.

An opening may be formed in the upper part of the lead box to face a receiving unit of the battery case, in which the electrode assembly is received. The upper electrode lead and the lower electrode lead may extend through the lead box in the state of being fixed to a proximal side surface and a distal side surface of the lead box, respectively, a proximal end of the lower electrode lead may be coupled to the electrode tabs, and a distal end of the upper electrode lead may be withdrawn out of the battery case.

The lower electrode lead may include inclined portions at opposite sides of the coupling part thereof that is coupled to the central part of the upper electrode lead. Each of the inclined portions may be made of an elastic material or a conductive metal material.

The closed-loop-type notch may be formed in a circular shape, an oval shape, or a polygonal shape. The closed-looptype notch may be continuously formed such that the depth of the closed-loop-type notch increases in the inward direction and decreases in the outward direction. The maximum depth of the notch may be 30% to 90% of the thickness of the electrode lead, and the minimum depth of the notch may be 10% to 50% of the thickness of the electrode lead under the condition that the minimum depth of the notch is less than the maximum depth of the notch.

An adhesive layer may be formed at each of the upper surface and the lower surface of the lead box. The lead box may be made of an electrically insulating material.

In accordance with another aspect of the present disclosure, there is provided a device including a secondary battery that includes the safety feature discloses herein. For example, the device may be selected from the group consisting of an electronic device, an electric vehicle, a hybrid electric vehicle, and a power storage device.

A secondary battery including an electrode lead having notches formed therein according to the present disclosure may prevent the flow of electric current in the secondary battery when the secondary battery is in an abnormal state as well as when the secondary battery is overcharged. In addition, the secondary battery according to the present disclosure may prevent a reduction in the energy density of the secondary battery in the case in which an additional complicated device is provided in the secondary battery. Further, the secondary battery according to the present disclosure may cut the electrode lead through deformation of the electrode lead in the case in which the pressure in the lower part of the lead box is lower than the pressure in the upper part of the lead box when the secondary battery swells due to gas generated in the secondary battery.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Exemplary embodiments of the present disclosure will be described in detail with reference to the accompanying drawings such that the exemplary embodiments of the present disclosure may be easily implemented by a person having ordinary skill in the art to which the present disclosure pertains. In describing the principle of operation of the exemplary embodiments of the present disclosure in detail, however, a detailed description of known functions and configurations incorporated herein will be omitted when the same may obscure the subject matter of the present disclosure.

Wherever possible, the same reference numbers will be used throughout the drawings to refer to parts that perform similar functions or operations. Meanwhile, in the case in which one part is 'connected' to another part in the following description of the present disclosure, not only may the one part be directly connected to the another part, but also, the one part may be indirectly connected to the another part via a further part. In addition, that a certain element is 'included' means that other elements are not necessarily excluded, but may be further included unless mentioned otherwise.

Reference will now be made in detail to the exemplary embodiments of the present disclosure, examples of which are illustrated in the accompanying drawings.

Figure 1:
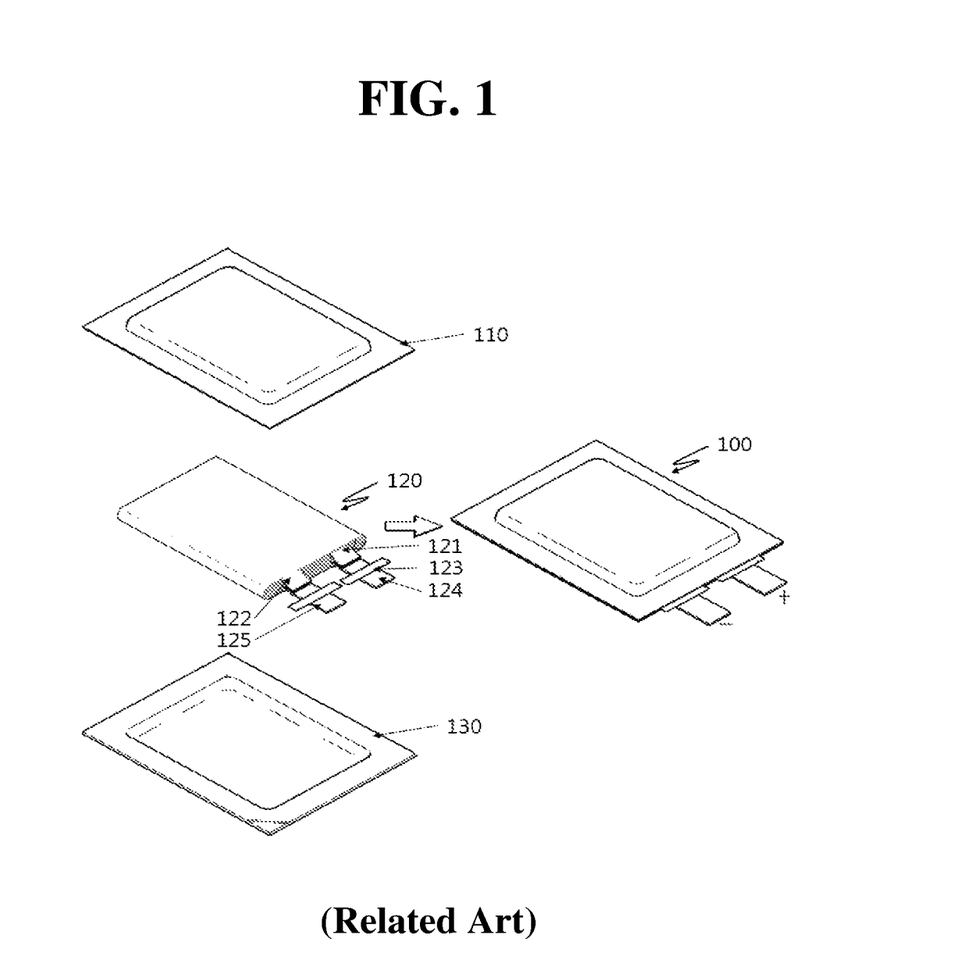
FIG. 1 is a view showing an illustrative conventional pouch-shaped battery cell.

FIG. 1 is a view showing an illustrative conventional pouch-shaped battery cell. In general, a lithium secondary battery is manufactured as follows. First, a mixture of an active material, a binder, and a plasticizer is applied to a positive electrode current collector and to a negative electrode current collector in order to manufacture a positive electrode plate and a negative electrode plate, respectively. Subsequently, a plurality of positive electrode plates and a plurality of negative electrode plates are stacked with separators interposed respectively between the positive electrode plates and the negative electrode plates to manufacture a battery cell having a predetermined shape. Subsequently, the battery cell is placed in a battery case, an electrolytic solution is injected into the battery case, and the battery case is sealed, whereby a secondary battery, such as a battery pack, is manufactured.

Electrode leads are connected to a general electrode assembly. Each of the electrode leads is configured to have a structure in which one end of the electrode lead is connected to the electrode assembly, the other end of the electrode lead is exposed outside of the battery case, and the battery case, in which the electrode assembly is disposed, is sealed by an adhesive layer, such as a sealant layer, at the portion of the battery case from which the electrode lead extends outwards from the battery case.

In addition, the electrode assembly is provided with electrode tabs. Each current collector plate of the electrode assembly includes a coated part, on which an electrode active material is coated, and a distal part (hereinafter, referred to as a "non-coated part"), on which the electrode active material is not coated. Each of the electrode tabs may be formed by cutting the non-coated part, or may be a separate conductive member connected to the non-coated part by ultrasonic welding. As shown, the electrode tabs may protrude in one direction such that the electrode tabs are formed at the electrode assembly to be arranged side by side. Alternatively, the electrode tabs may protrude in opposite directions.

Each electrode tab serves as a path along which electrons move between the inside and the outside of the battery. The electrode leads are connected to respective electrode tabs by spot welding. The electrode leads may extend in the same direction or in opposite directions depending on the position at which positive electrode tabs and negative electrode tabs are formed. A positive electrode lead and a negative electrode lead may be made of different materials. For example, the positive electrode lead may be made of the same material as the positive electrode plate, such as an aluminum (Al) material, and the negative electrode lead may be made of the same material as the negative electrode plate, such as a copper (Cu) material or a copper material coated with nickel (Ni). Finally, the electrode leads are electrically connected to external terminals via terminal parts thereof.

A pouch sheathing member contains the electrode assembly in a sealed state such that a portion of each of the electrode leads, i.e. the terminal part of each of the electrode leads, is exposed from the pouch sheathing member. As previously described, a sealing layer, such as a sealant layer, is interposed between each of the electrode leads and the pouch sheathing member. The pouch sheathing member is provided at the edge thereof with a sealed region. A horizontal slit in each of the electrode leads is spaced apart from the sealed region toward a joint. That is, in the case in which each of the electrode leads is formed so as to have an inverted T shape, the leg part of the T shape protrudes outwards from the pouch sheathing member, whereas a portion of the head part of the T shape is disposed in the sealed region.

In general, a positive electrode current collector plate is made of an aluminum material, and a negative electrode current collector plate is made of a copper material. When a swelling phenomenon occurs, copper foil tends to rupture more easily than aluminum foil. For this reason, the negative electrode lead may rupture more easily than the positive electrode lead. Preferably, therefore, an electrode lead capable of rupturing with less effort is used as the negative electrode lead.

When the secondary battery is in a normal state, the electrode assembly is isolated from the outside due to the sealing layer. When the pressure in the battery increases as a result of overcharging the battery or an increase in the temperature of the battery, however, the battery case may swell. When swelling occurs, a weak portion of the battery case or a weak adhesion portion between another component of the secondary battery and the battery case ruptures, whereby gas is exhausted from the battery.

If the electrode leads are electrically connected to the electrode assembly, however, electric current continuously flows in the battery, which makes it difficult to secure the safety of the battery. In order to solve this problem, the amount of electrolyte that is injected into the secondary battery may be adjusted, or the short-circuit pressure of a current interrupt device (CID) may be adjusted. In this case, however, the safety of the battery is reduced when the battery is overcharged. In other words, it is difficult not only to secure the safety of the battery when the battery is overcharged but also to secure the safety of the battery when the battery is used in a high-temperature situation.

Comparative Example

Figure 2:
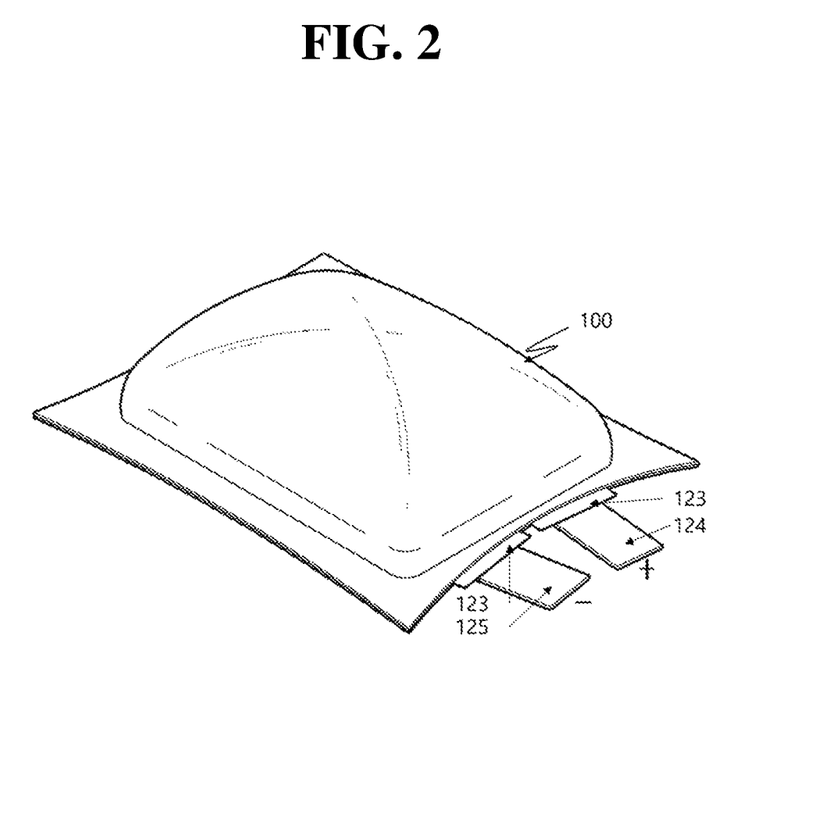
FIG. 2 is a view showing an increase in the volume of the illustrative pouch-shaped battery cell due to gas generated in the battery cell.

FIG. 2 is a view showing an increase in the volume of the illustrative pouch-shaped battery cell due to gas generated in the battery cell.

A pouch-shaped battery case includes a gas barrier layer and a sealant layer. The pouch-shaped battery case may further include a surface protective layer, which is the outermost layer formed on the gas barrier layer. The gas barrier layer is configured to prevent the introduction of gas into the battery cell. The gas barrier layer is mainly made of aluminum (Al) foil. The sealant layer is the innermost layer of the pouch-shaped battery case, which contacts the member disposed in the pouch-shaped battery case, i.e. a cell. The surface protective layer is mainly made of a nylon resin in consideration of wear resistance and heat resistance. The pouch-shaped battery case is manufactured by forming a film having the above-described stack structure into the shape of a pouch. Components that constitute the cell, such as positive electrodes, negative electrodes, and separators, are disposed in the pouch-shaped battery case in the state of being impregnated with an electrolytic solution. After the components that constitute the cell are disposed in the pouch-shaped battery case, the sealant layers are sealed by thermal bonding at the entrance of the pouch-shaped battery case. Since each of the sealant layers contacts the components that constitute the cell, it is necessary for each of the sealant layers to exhibit high insulation and high resistance to the electrolytic solution. In addition, it is necessary for each of the sealant layers to exhibit high sealability to such an extent that the pouch-shaped battery case can be isolated from the outside. In particular, it is necessary for the sealed portion of the pouch-shaped battery case at which the sealant layers are sealed by thermal bonding to exhibit high thermal adhesive strength. In general, a sealant layer is made of a polyolefin-based resin, such as polypropylene (PP) or polyethylene (PE). In particular, each of the sealant layers of the pouch-shaped battery case is mainly made of polypropylene (PP), since polypropylene exhibits desirable mechanical properties, such as high tensile strength, high rigidity, high surface hardness, and high impact resistance, as well as high resistance to an electrolytic solution.

However, the conventional pouch-shaped secondary battery is unsafe from the aspect of risk of explosion. In general, heat and/or pressure are generated in a cell while electricity is produced/used (i.e. charged/discharged) in the cell (i.e. while an oxidation-reduction reaction occurs in the cell). High heat and/or pressure may be generated in the cell due to overcharging of the cell or a short circuit in the cell, which may be caused by an abnormal reaction in the cell. The cell may explode due to heat and/or pressure. The conventional pouch-shaped secondary battery is not provided with any technical means that is capable of preventing the secondary battery from exploding. As a result, the conventional pouch-shaped secondary battery is exposed to a risk of explosion.

Embodiments

A pouch-shaped secondary battery may include an electrode assembly in which a positive electrode and a negative electrode are stacked with a separator interposed between the positive electrode and the negative electrode, an electrode lead electrically connected to electrode tabs of the electrode assembly, a pouch-shaped battery case made of a laminate sheet including an outer coating layer, a metal layer, and an inner sealant layer, and a lead box disposed on a sealed portion of the battery case for receiving the electrode lead, wherein the electrode lead may include a lower electrode lead, which is electrically connected to the electrode tabs, and an upper electrode lead, a portion of which is coupled to the lower electrode lead.

The electrode lead may include a lower electrode lead electrically connected to the electrode tabs, and the thickness of the lower electrode lead may be relatively small. In addition, each of the upper electrode lead and the lower electrode lead may be made of a material coated with conductive foil or a conductive metal. Each of the upper electrode lead and the lower electrode lead may be made of a polymer resin. The polymer resin, of which each of the upper electrode lead and the lower electrode lead is made, may include a conductive agent.

At least one selected from among graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, nickel powder, gold powder, silver powder, copper powder, or powder having a core-shell structure in which one kind of metal is coated on another kind of metal; conductive whisker, such as a zinc oxide or potassium titanate; a conductive metal oxide, such as a titanium oxide; and a conductive material, such as a polyphenylene derivative, may be used as the conductive agent.

The thickness of the upper electrode lead may be less than the thickness of the lower electrode lead. The thickness of the upper electrode lead may be within a range from 200 µm to 5 mm, preferably from 200 µm to 2 mm to improve the conduction performance, heat dissipation performance, and energy density of the secondary battery.

Figure 4:
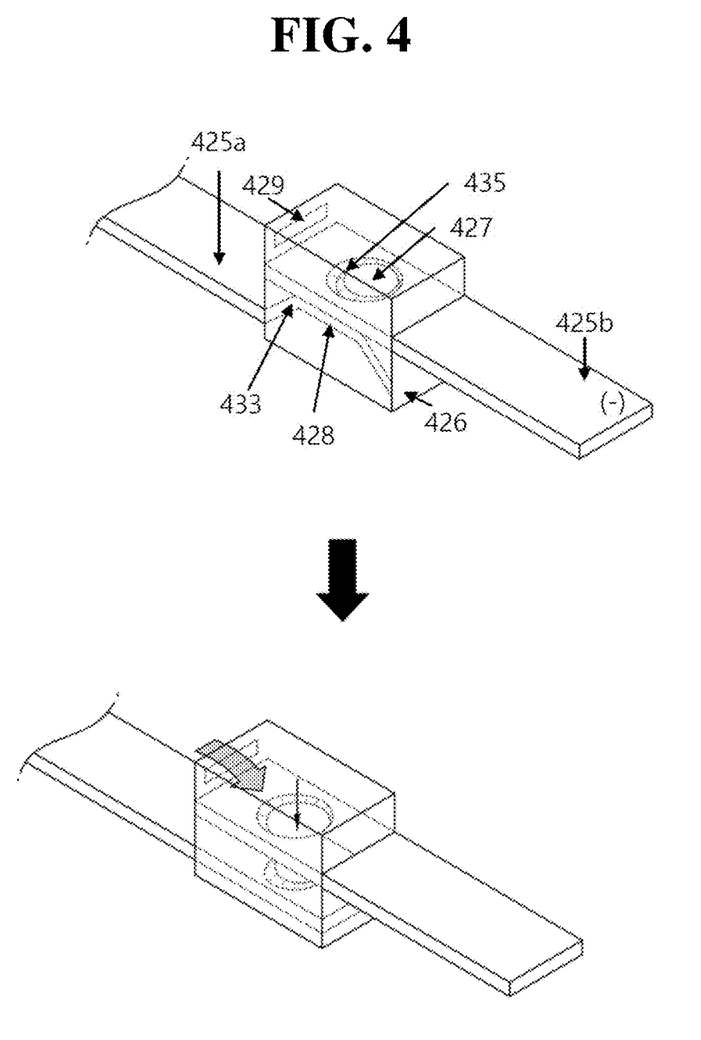
FIG. 4 is a view showing a pouch-shaped secondary battery including a lead box configured to receive an electrode lead having a closed-loop-type notch formed therein according to another exemplary embodiment of the present disclosure, before and after the pouch-shaped secondary battery is short-circuited.

Referring to FIG. 4, a closed-loop-type notch 435 may be formed in one surface of the upper electrode lead. Specifically, a portion of the lower surface of an upper electrode lead 425b may be coupled to the upper surface of a lower electrode lead 425a, and a notch 435 having a circular planar shape may be formed in the surface of the upper electrode lead 425b that is opposite the surface of the upper electrode lead 425b that is coupled to the lower electrode lead. The notch may be formed to have an oval shape or a polygonal shape, in addition to the circular shape, but the present disclosure is not limited thereto.

The closed-loop-type notch 435 may be formed such that the depth and width of the notch are uniform. Alternatively, the depth and width of the notch may not be uniform such that the notch may initiate a rupture from one side thereof.

The closed-loop type notch 435 may be configured to have a structure in which the depth and width of the notch gradually increase toward the lower electrode lead 425a and in which the depth and width of the notch gradually decrease toward the upper electrode lead 425b. The depth and width of the notch may continuously increase or decrease. Alternatively, the depth and width of the notch may discontinuously increase or decrease.

The maximum depth of the notch may be 30% to 90% of the thickness of the electrode lead, and the minimum depth of the notch may be 10% to 50% of the thickness of the electrode lead under the condition that the minimum depth of the notch is less than the maximum depth of the notch.

Figure 3:
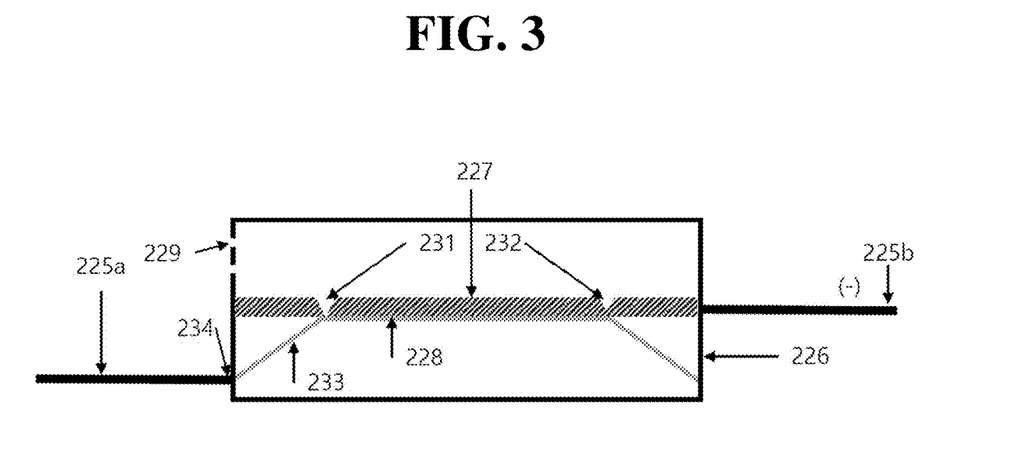
FIG. 3 is a view showing a lead box configured to receive an electrode lead having a notch formed therein according to an exemplary embodiment of the present disclosure.

An opening 229, 329 and 429 may be formed in the upper part of a lead box 226, 326 and 426 for receiving the electrode lead having the notch formed therein. Gas generated in the battery cell may flow into the lead box through the opening 229, 329 and 429. In the case in which the pressure in the upper part of the lead box exceeds a predetermined level, the closed-loop-type notch may be initiated to rupture from the weak portion thereof, and the entirety of the notch may rupture. As a result, the lower electrode lead coupling part may be separated from the upper electrode lead coupling part, and displaced downwards, whereby the path of electrons may be interrupted.

Figure 5:
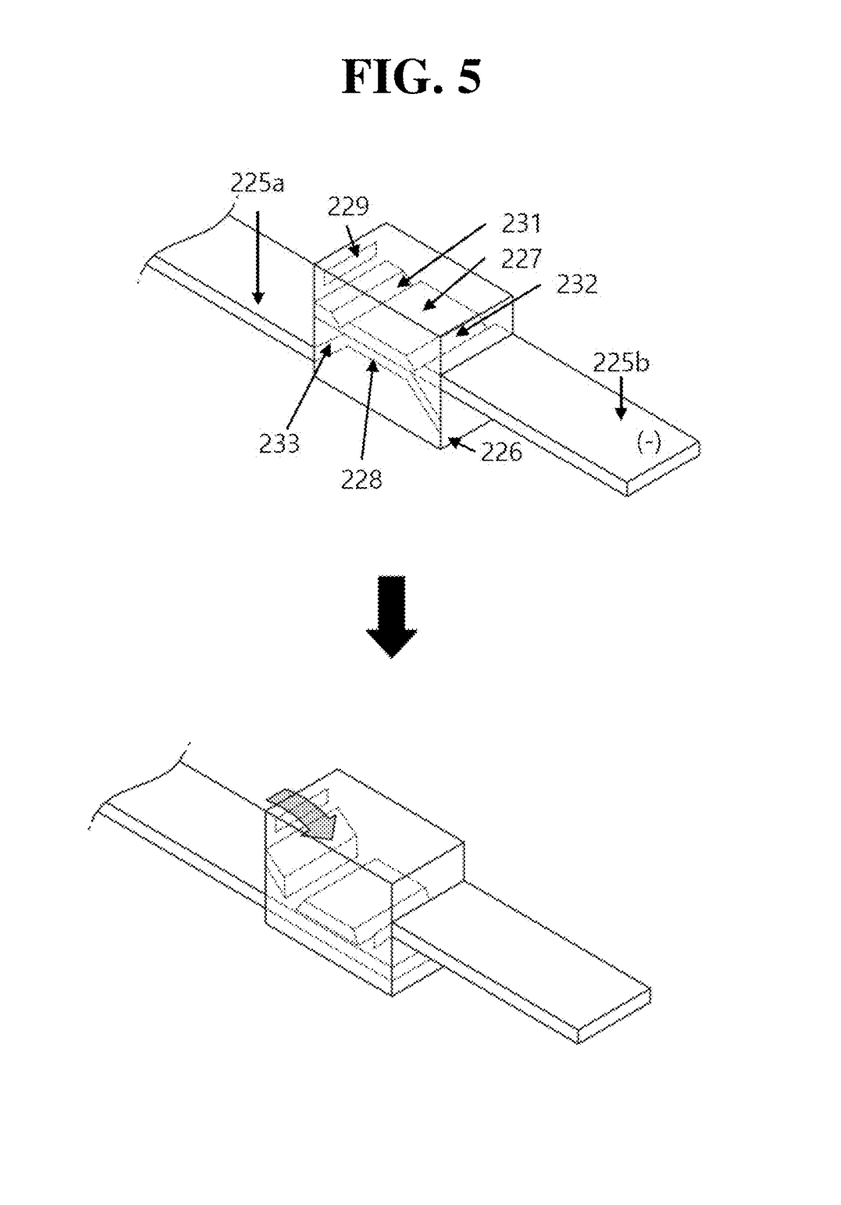
FIG. 5 is a view showing a pouch-shaped secondary battery including a lead box configured to receive an electrode lead having a pair of notches formed therein according to yet another exemplary embodiment of the present disclosure, before and after the pouch-shaped secondary battery is short-circuited.

In another aspect of the present disclosure, referring to FIG. 5, a pair of notches 231 and 232 may be formed in the upper electrode lead in a direction that is perpendicular to the longitudinal direction of the electrode lead. An upper electrode lead coupling part 227 and 327, which is disposed between the notches, may be coupled to a lower electrode lead coupling part 228 and 328.

In addition, the length of each of the electrode leads 225a and 225b in the direction that is parallel to the notches 231 and 232 may be the same as the width of each of the electrode leads 225a and 225b. The lower electrode lead may extend from the inner surface of a proximal side of the lead box to the inner surface of a distal side of the lead box such that the lower part of the lead box has a structure that is hermetically sealed by the lower electrode lead. The pressure in the lower part of the lead box, which is hermetically sealed, may be lower than atmospheric pressure or 1.5 atm.

Further, an opening 229 and 329 may be formed in the upper part of the lead box to face a receiving unit of the battery case, in which the electrode assembly is received.

The upper electrode lead 225b and 325b and the lower electrode lead 225a and 325a may extend through the lead box 226 and 326 in the state of being fixed to a proximal side surface and a distal side surface of the lead box, respectively. A proximal end of the lower electrode lead may be coupled to the electrode tabs, and a distal end of the upper electrode lead may be withdrawn out of the battery case. The lower electrode lead may include inclined portions 233 and 333 at opposite sides of the coupling part thereof that is coupled to the central part of the upper electrode lead. Each of the inclined portions may be made of an elastic material or a conductive metal material.

As shown in FIG. 3, the notches may be formed to have different depths. In particular, the depth of the notch 231 that is disposed inside may be greater than the depth of the notch 232 that is disposed outside. The notch that is disposed inside is hereinafter termed a proximal notch 231, and the notch that is disposed outside is hereinafter termed a distal notch 232. The terms "inside" and "proximal" correspond to the side that faces the electrode assembly, and the terms "outside" and "distal" correspond to the outside of the pouch-shaped battery case.

The thickness of the upper electrode lead at the part thereof at which the inside notch is formed may be 10% to 90% of the thickness of the upper electrode lead at the part thereof at which no notches are formed to allow the electrode lead to be cut when gas is generated in the battery due to an abnormal state of the battery.

In addition, an adhesive layer may be formed at each of the upper surface and the lower surface of the lead box. Further, the lead box may be made of an electrically insulating material.

The present disclosure may provide a device including a secondary battery including the safety feature disclosed above. For example, the device may be selected from the group consisting of an electronic device, an electric vehicle, a hybrid electric vehicle, and a power storage device.

The thickness of the lead box may be 500 µm or more, preferably 500 µm to 2 mm to improve the conduction performance, heat dissipation performance, and energy density of the secondary battery.

The space defined by the lower electrode lead, the inclined portions, and the lead box may be filled with air and/or inert gas. The inert gas may include at least one of nitrogen or argon. The pressure in the lower part of the lead box may be within a range from 0 to 1.5 atm. The inner pressure condition may be differently set depending on the thickness of the notch and the target pressure at which the notch ruptures. In the case in which the set inner pressure is low, the flow of electric current in the electrode assembly may be interrupted when the battery is in a normal state. In the case in which the set inner pressure is high, the flow of electric current in the electrode assembly may not be interrupted when the battery is in an abnormal state.

The lead box may be made of a non-conductive resin or a material coated with a non-conductive resin. The polymer, which is a thermosetting polymer resin, may include at least one selected from among an acrylic resin, an epoxy resin, an ethylene propylene diene monomer (EPDM) resin, a chlorinated polyethylene (CPE) resin, silicone, polyurethane, a urea resin, a melamine resin, a phenol resin, an unsaturated ester resin, polypropylene (PP), polyethylene (PE), polyimide, and polyamide. Preferably, an acrylic resin may be used as thermosetting polymer resin.

In particular, the lower electrode lead may abut the part of the upper electrode lead between the notches. Additionally, the upper electrode lead and the lower electrode lead may extend through the lead box in the state of being fixed to a proximal side surface and a distal side surface of the lead box, respectively. A proximal end of the lower electrode lead may be coupled to the electrode tabs, and a distal end of the upper electrode lead may be withdrawn out of the battery case.

At least one opening may be formed in one side of the lead box. Gas generated in the pouch-shaped battery cell when the pouch-shaped battery cell is in an abnormal state may be introduced into the lead box through the opening in the case in which the pouch-shaped battery cell swells due to the gas generated therein. In addition, the lead box may be provided with insertion holes, through which the upper electrode lead and the lower electrode lead can be inserted.

Figure 6:
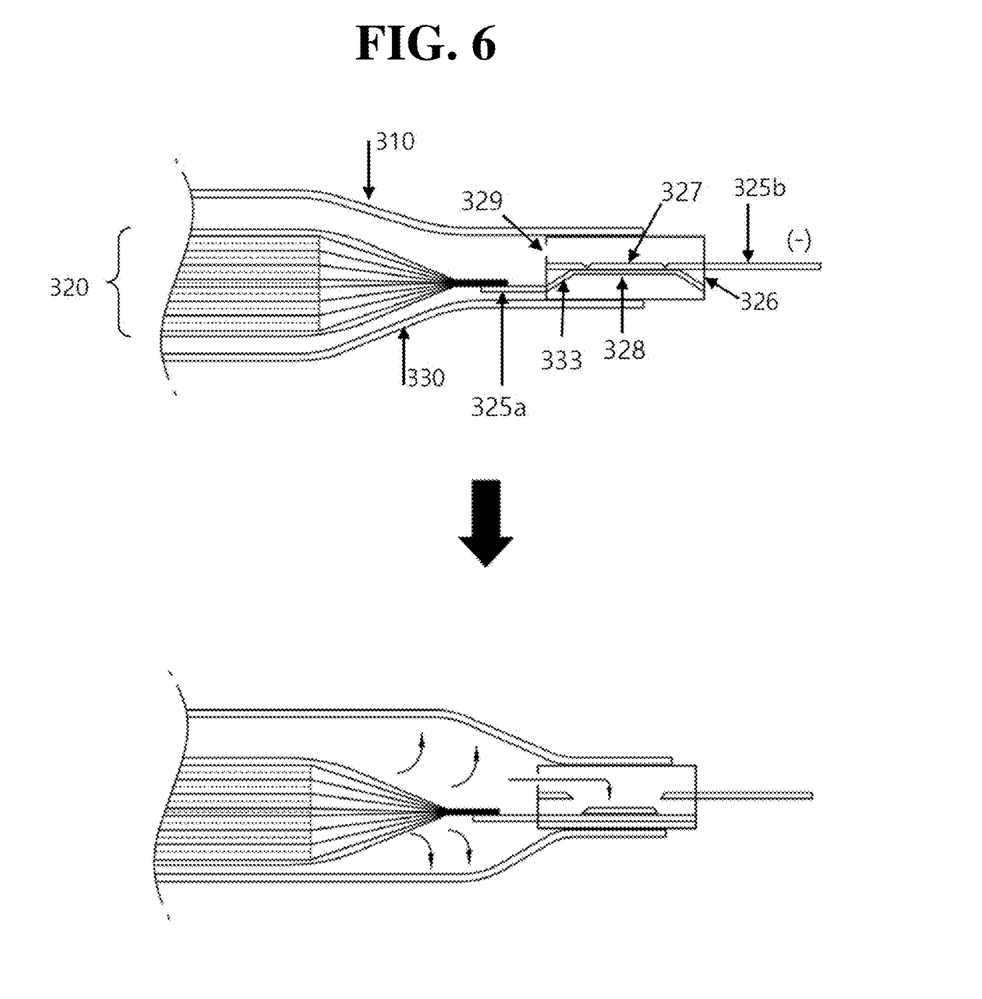
FIG. 6 is a view showing an electrode lead unit of the pouch-shaped secondary battery including the lead box configured to receive the electrode lead having the closed-loop-type notch formed therein according to the exemplary embodiment of the present disclosure, before and after the electrode lead unit is cut.
Figure 7:
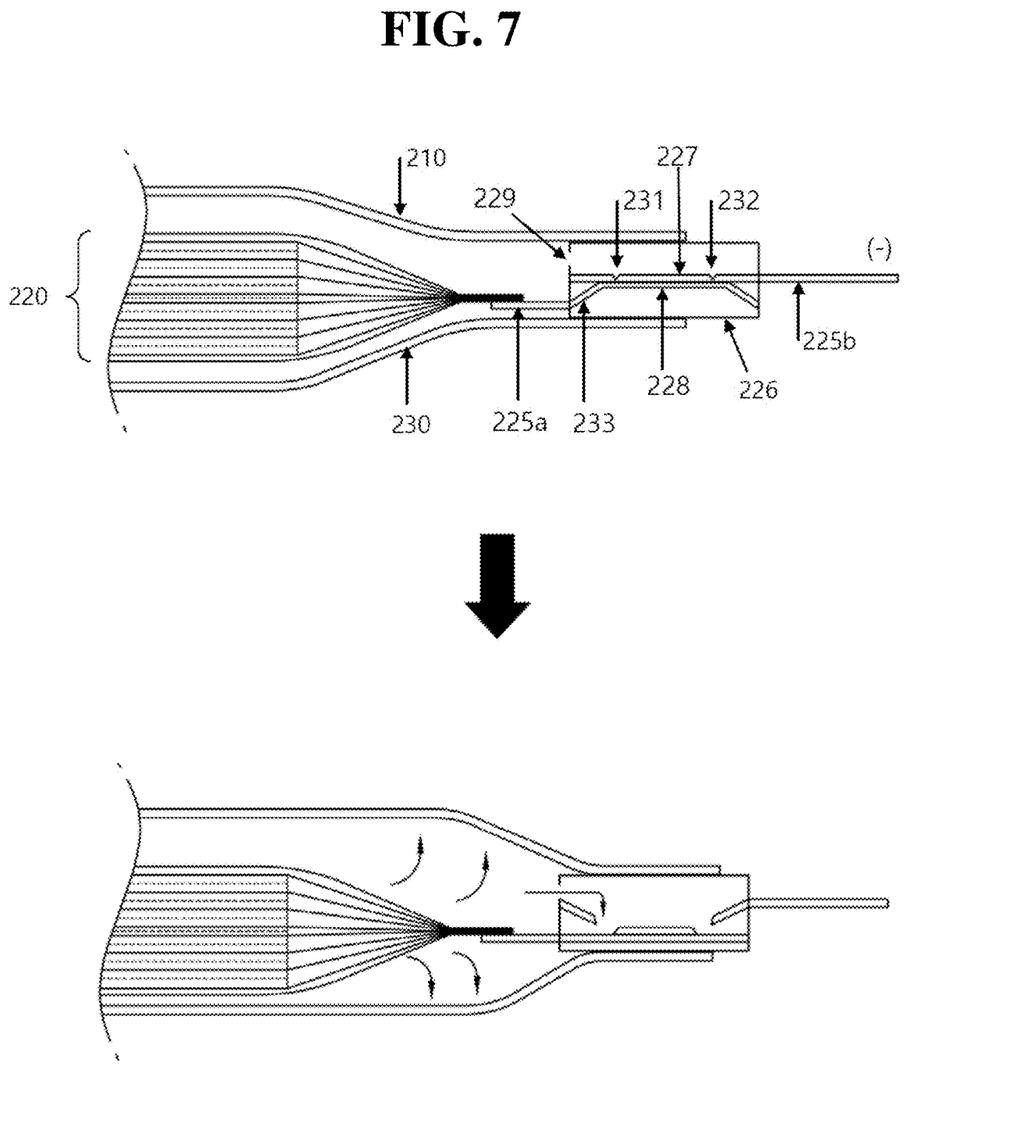
FIG. 7 is a view showing an electrode lead unit of the pouch-shaped secondary battery including the lead box configured to receive the electrode lead having the pair of notches formed therein according to the exemplary embodiment of the present disclosure, before and after the electrode lead unit is cut.

Referring to FIGS. 6 and 7, the process of the electrode lead being cut will be described. When the secondary battery is in an abnormal state, gas may be generated in the secondary battery, and the pressure in the secondary battery may increase. As a result, the pouch-shaped battery case may swell. As the pouch-shaped battery case swells, the gas generated in the secondary battery may be introduced into the lead box through the opening formed in the lead box.

In the case when the pressure in the lower part of the lead box, which is defined by the lower electrode lead received in the lead box, is lower than the pressure of the gas generated in the pouch-shaped battery cell in the state in which the upper electrode lead and the lower electrode lead abut each other in the lead box, the lower electrode lead may shrink or be deformed, whereby the lower electrode lead may be separated from the upper electrode lead. As a result, the electrode lead may be cut.

The electrode lead may be cut initially from the notches, which are asymmetrically formed in the upper electrode lead. The inclined portions may be inverted by the pressure in the lower part of the lead box to interrupt the flow of electric current in the battery. The pressure in the lower part of the lead box, in which the inclined portions are disposed, may be less than 1.5 atm.

At least one lithium-containing metal oxide selected from the group of a lithium cobalt oxide, a lithium nickel oxide, a lithium manganese oxide, a lithium cobalt-nickel oxide, a lithium cobalt-manganese oxide, a lithium manganese-nickel oxide, a lithium cobalt-nickel-manganese oxide, a lithium iron phosphate oxide having an olivine structure, a lithium manganese oxide having a spinel structure, and an oxide obtained by replacing at least one of the above-specified elements with another element(s) different from the above-specified elements or doping another element(s) different from the above-specified elements may be used as the positive electrode active material. Here, the another element(s) may be at least one selected from the group consisting of Al, Mg, Mn, Ni, Co, Cr, V, and Fe.

A lithium metal, a lithium alloy (for example, an alloy of lithium and metal, such as aluminum, zinc, bismuth, cadmium, antimony, silicon, lead, tin, gallium, or indium), amorphous carbon, crystalline carbon, carbon composite, or $SnO_2$ may be used as the negative electrode active material. However, the present disclosure is not limited thereto.

In addition, the present disclosure may provide a device including a pouch-shaped secondary battery with a safety feature disclosed above. For example, the device may be selected from the group consisting of an electronic device, an electric vehicle, a hybrid electric vehicle, and a power storage device.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A pouch-shaped secondary battery comprising:
an electrode assembly in which a positive electrode and a negative electrode are stacked with a separator interposed between the positive electrode and the negative electrode;
an electrode lead electrically connected to electrode tabs of the electrode assembly;
a pouch-shaped battery case made of a laminate sheet including an outer coating layer, a metal layer, and an inner sealant layer; and
a lead box disposed on a sealed portion of the battery case for receiving the electrode lead,
wherein the electrode lead includes a lower electrode lead, which is electrically connected to the electrode tabs, and an upper electrode lead, a portion of which is coupled to the lower electrode lead, and
wherein the portion of the upper electrode lead includes a notch that is configured to rupture and electrically separate the upper electrode lead and the lower electrode lead when a pressure difference between a space within the lead box above the upper electrode lead and a space within the lead box below the lower electrode lead exceeds a predetermined pressure.

2. The pouch-shaped secondary battery according to claim 1, wherein a closed-loop-type notch is formed in one surface of the upper electrode lead.

3. The pouch-shaped secondary battery according to claim 2, wherein a surface of the upper electrode lead within a boundary of the closed-loop-type notch is configured to be coupled to the lower electrode lead.

4. The pouch-shaped secondary battery according to claim 2, wherein a depth of the closed-loop-type notch is non-uniform.

5. The pouch-shaped secondary battery according to claim 1, wherein a pair of notches are formed in one surface of the upper electrode lead, and each of the pair of notches is formed in a direction that is perpendicular to a longitudinal direction of the electrode lead.

6. The pouch-shaped secondary battery according to claim 5, wherein a central part of the upper electrode lead, which is disposed between the pair of notches, is configured to be coupled to the lower electrode lead.

7. The pouch-shaped secondary battery according to claim 5, wherein the pair of notches are configured such that a depth of a proximal notch is greater than a depth of a distal notch.

8. The pouch-shaped secondary battery according to claim 7, wherein a thickness of the upper electrode lead at a part thereof at which the proximal notch is formed is 10% to 90% of a thickness of the upper electrode lead at a part thereof at which no notches are formed.

9. The pouch-shaped secondary battery according to claim 1, wherein the upper electrode lead and/or the lower electrode lead extends from an inner surface of a proximal side of the lead box to an inner surface of a distal side of the lead box such that a lower part of the lead box is configured to be hermetically sealed.

10. The pouch-shaped secondary battery according to claim 9, wherein a pressure in the lower part of the lead box that is hermetically sealed is less than 1.5 atm.

11. The pouch-shaped secondary battery according to claim 1, wherein an opening is formed in an upper part of the lead box to face a receiving unit of the battery case, in which the electrode assembly is received.

12. The pouch-shaped secondary battery according to claim 1, wherein the upper electrode lead and the lower electrode lead extend through the lead box in a state of being fixed to a proximal side surface and a distal side surface of the lead box, respectively, a proximal end of the lower electrode lead is coupled to the electrode tabs, and a distal end of the upper electrode lead is withdrawn out of the battery case.

13. The pouch-shaped secondary battery according to claim 1, wherein the lower electrode lead includes inclined portions at opposite sides of a coupling part thereof that is coupled to a central part of the upper electrode lead.

14. The pouch-shaped secondary battery according to claim 13, wherein each of the inclined portions is made of an elastic material.

15. The pouch-shaped secondary battery according to claim 13, wherein each of the inclined portions is made of a conductive metal material.

16. The pouch-shaped secondary battery according to claim 2, wherein the closed-loop-type notch is formed in a circular shape, an oval shape, or a polygonal shape.

17. The pouch-shaped secondary battery according to claim 4, wherein the closed-loop-type notch is continuously formed such that a depth of the closed-loop-type notch increases in an inward direction and decreases in an outward direction.

18. The pouch-shaped secondary battery according to claim 17, wherein a maximum depth of the notch is 30% to 90% of a thickness of the electrode lead, and a minimum depth of the notch is 10% to 50% of the thickness of the electrode lead under a condition that the minimum depth of the notch is less than the maximum depth of the notch.

19. The pouch-shaped secondary battery according to claim 1, wherein an adhesive layer is formed at each of an upper surface and a lower surface of the lead box.

20. The pouch-shaped secondary battery according to claim 1, wherein the lead box is made of an electrically insulating material.

* * * * *